(12) United States Patent  (10) Patent No.: US 7,766,545 B2
Salkeld  (45) Date of Patent: Aug. 3, 2010

(54) SAFETY LID AND METHOD FOR USE OF SAME

(75) Inventor: Joseph M. Salkeld, Argyle, TX (US)

(73) Assignee: Deana S. Salkeld, Argyle, TX (US)

( * ) Notice: Subject to any disclaimer, the term of this patent is extended or adjusted under 35 U.S.C. 154(b) by 965 days.

(21) Appl. No.: 11/549,077

(22) Filed: Oct. 12, 2006

(65) Prior Publication Data

US 2008/0112459 A1  May 15, 2008

(51) Int. Cl.
*G01K 13/00* (2006.01)
*G01K 7/00* (2006.01)
(52) U.S. Cl. .................. 374/157; 374/141; 374/163
(58) Field of Classification Search .......... 374/208, 374/120, 150, 157
See application file for complete search history.

(56) References Cited

U.S. PATENT DOCUMENTS

| 4,094,433 A | 6/1978 | Numbers |
| 4,298,143 A | 11/1981 | Peterson |
| 5,000,581 A | 3/1991 | Yata et al. |
| 5,229,751 A | 7/1993 | Chandler et al. |
| 5,482,373 A | 1/1996 | Hutchinson |
| 5,678,925 A | 10/1997 | Garmaise et al. |
| 5,720,555 A | 2/1998 | Elele |
| 5,786,578 A * | 7/1998 | Christy et al. ............... 219/720 |
| 6,062,126 A | 5/2000 | Johnson et al. |
| 6,386,756 B1 | 5/2002 | Rice |
| 6,471,085 B1 | 10/2002 | Gallo |
| 6,864,462 B2 | 3/2005 | Sansoner et al. |
| 2002/0167989 A1* | 11/2002 | Russo ......................... 374/141 |
| 2005/0178773 A1* | 8/2005 | Sena et al. ................... 220/703 |
| 2006/0283856 A1* | 12/2006 | Spinelli et al. .............. 220/201 |

* cited by examiner

*Primary Examiner*—Gail Verbitsky
*Assistant Examiner*—Mirellys Jagan
(74) *Attorney, Agent, or Firm*—Scott T. Griggs; Griggs Bergen LLP

(57) ABSTRACT

A safety lid is disclosed for use in combination with a drinking cup. In one embodiment, a body of integrally molded construction is provided that is shaped to fit a lip of the drinking cup. A fluid passageway traverses the body to permit a liquid in the drinking cup to be sipped therethrough. Microcomponents are embedded in the body and operably connected for measuring a temperature of the liquid and if the measured temperature is outside of a temperature range closing the fluid passageway.

7 Claims, 3 Drawing Sheets

$T_{LIQUID} > T_{LOW}$
AND
$T_{LIQUID} < T_{HIGH}$ $T_{LIQUID} \leq T_{LOW}$
OR
$T_{LIQUID} \geq T_{HIGH}$

SAFETY LID AND METHOD FOR USE OF SAME

TECHNICAL FIELD OF THE INVENTION

This invention relates, in general, to beverage containers and, in particular, to a safety lid for use in combination with a drinking cup that monitors beverage temperature and, depending on the beverage temperature, restricts the flow of the beverage from the drinking cup.

BACKGROUND OF THE INVENTION

Certain individuals, such as burn patients, are particularly sensitive to heat and cold. Hot and cold beverages present particular problems to these individuals who may only be able to consume beverages that are in a restricted temperature range. Existing beverage containers do not adequately monitor the temperature of the liquids therein and provide an alert to the individual about the temperature. Additionally, existing beverage containers do not have a mechanism for preventing beverage flow if the temperature of the beverage is outside of the restricted temperature range.

SUMMARY OF THE INVENTION

Accordingly, a safety lid is disclosed for use in combination with a drinking cup. In one embodiment, the safety lid provides a low cost, disposable solution with medical application that monitors liquid temperature for individuals, such as burn patients, that are particularly sensitive to temperature and can only intake liquids within a selective temperature range. The safety lid evaluates the measured temperature of the liquid and, in one implementation, prevents beverage flow if the temperature is outside of the selective temperature range.

More particularly, a body of integrally molded construction is provided that is shaped to fit a lip of a drinking cup. A fluid passageway traverses the body to permit a liquid in the drinking cup to be sipped or poured therethrough. Microcomponents are embedded in the body and operably connected for measuring the temperature of the liquid and, if the measured temperature is outside of a temperature range, closing the fluid passageway.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1A:
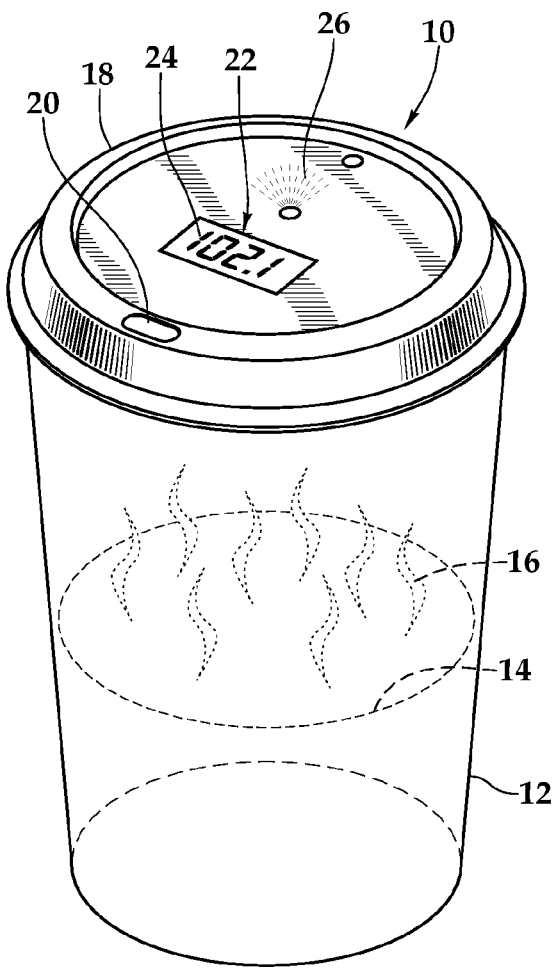
FIG. 1A is a front perspective view of one embodiment of a safety lid in a closed operating configuration being used in combination with a drinking cup.

Referring initially to FIG. 1A, therein is depicted a safety lid 10 for a drinking cup 12 that contains a liquid which is illustrated as a beverage 14. As indicated by the wavy lines 16, the beverage 14 is hot. The safety lid 10 includes a body 18 having a fluid passageway 20 that traverses therethrough to permit the beverage 14 in the drinking cup 12 to be sipped or poured. Microcomponents, which are generally represented by numeral 22, are embedded in the body 18 and operably connected for measuring a temperature of the beverage 14 and providing a visual indication 24 of the temperature, which in the illustrated embodiment is 102.1° F. (38.9° C.). The microcomponents 22 compare the measured temperature to a temperature threshold which is stored in memory. As will be explained in further detail hereinbelow, the temperature threshold may comprise a single temperature or two temperatures that define a range, for example. In the instance of a temperature range, if the measured temperature is outside of the stored temperature range, then the microcomponents 22 close the fluid passageway 20 as shown in FIG. 1A. Further, in the illustrated embodiment, the microcomponents 22 provide an audio indication or audio alert signal, as represented by numeral 26, that the temperature of the beverage 14 is outside of the stored temperature range.

Figure 1B:
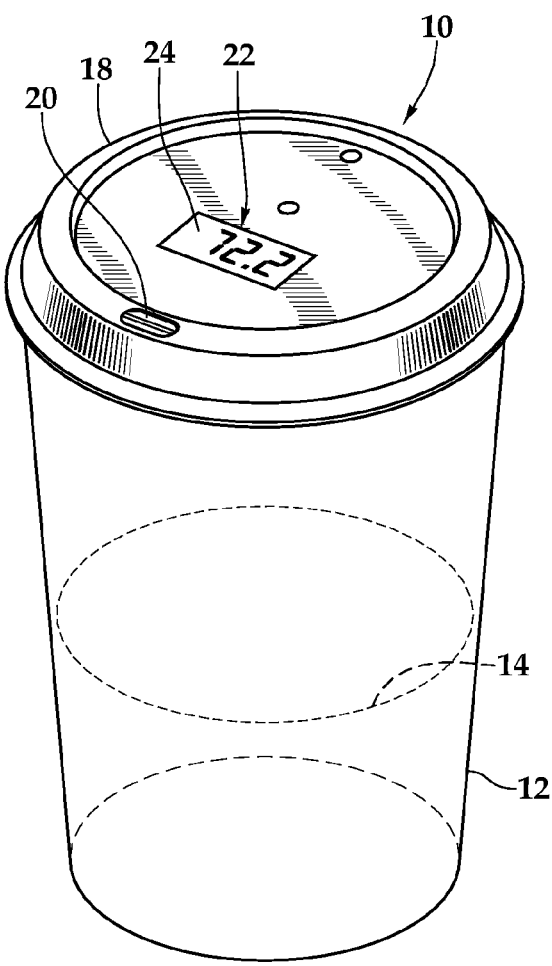
FIG. 1B is a front perspective view of the safety lid and drinking cup of FIG. 1A, wherein the safety lid is in an open configuration.

FIG. 1B depicts the safety lid 10 and drinking cup 12 after the beverage 14 has cooled. The microcomponents 22 measure a temperature of 72.2° F. (22.3° C.) which is provided by the visual indication 24. As this temperature is within the stored temperature range, the microcomponents 22 open the fluid passageway 20, thereby permitting the beverage 14 to be drank by an individual. As the temperature of the beverage 14 is within the range, the audio indication has stopped alerting the individual.

Figure 2A:
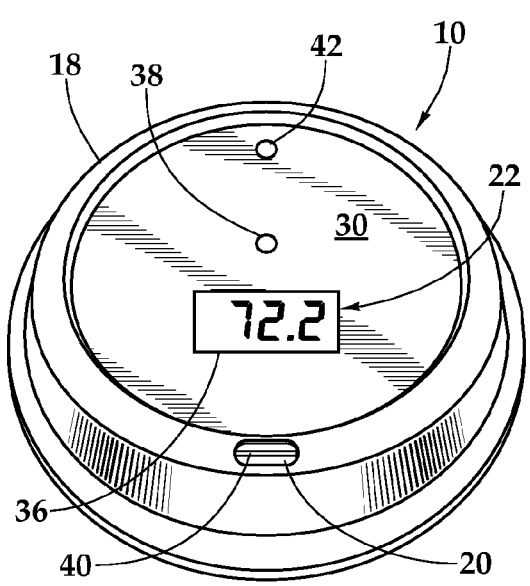
FIG. 2A is a top perspective view of the safety lid.
Figure 2B:
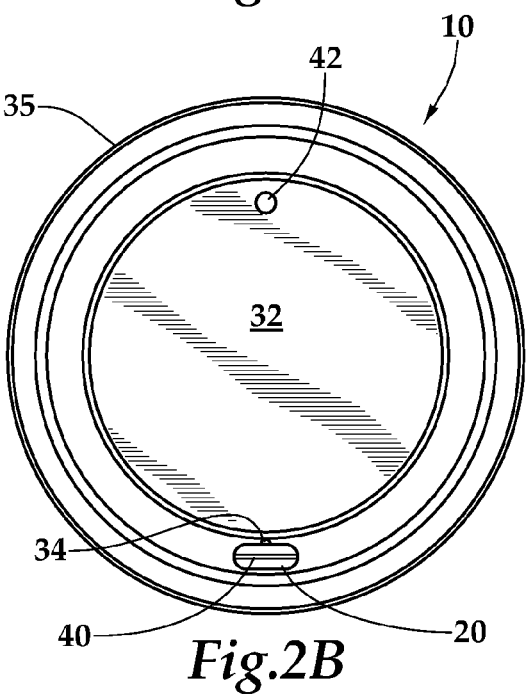
FIG. 2B is a bottom perspective view of the safety lid.

FIGS. 2A and 2B depict one embodiment of the safety lid 10 in greater detail. The body 18 of the safety lid 10 may include integrally molded construction defining an outside 30 and an inside 32 having an annular slot 35 that is shaped to securely fit a lip of a drinking cup, such as the drinking cup 12 of FIGS. 1A and 1B. This body 18 may be manufactured from injection molding or other suitable technique that forms desired shapes from polymers and resin materials. As part of the manufacturing process, the fluid passageway 20 may be formed from the body 18. Further, as part of the manufacturing process, the microcomponents 22 are disposed and/or embedded within the molded body. As will be discussed in further detail hereinbelow, these microcomponents 22 include a thermometer 34, a microcontroller (not illustrated in FIGS. 2A and 2B; numeral 50 in FIG. 3), a visual display 36, an audio indicator 38, a valve 40, and a one-way pressure valve 42. It should be appreciated that although a particular diameter and size of safety lid is presented, a variety of standard and non-standard sizes of safety lids may be manufactured in accordance with the teachings presented herein.

As best seen in FIG. 2B, the thermometer 34 is positioned proximate to the fluid passageway 20 in order to measure the temperature of the beverage 14 within the drinking cup 12. Further, by positioning the thermometer 34 proximate to the fluid passageway 20, the thermometer 34, in combination with the other microcomponents 22, is operable to close the fluid passageway 20 in sufficient time in response to a too hot or too cold beverage 14, for example, contacting the thermometer 34 near the fluid passageway 20 and exterior of the safety lid 10. In another embodiment, however, the thermometer 34 includes a flexible extension arm or loop having a temperature sensing element. The flexible extension arm hangs from the safety lid 10 and dips into the beverage 14, thereby providing near constant contact between the thermometer 34 and the beverage 14.

The microcontroller comprises electronic circuitry embedded in the body 18 that performs arithmetic, logic, and control operations with the assistance of internal memory. In particular, the microcontroller controls the opening and closing of the fluid passageway 20 by way of a valve 40. Additionally, the microcontroller controls the visual display 36 and audio indicator 38. The visual display 36 may have a variety of forms. For example, the visual display 36 may comprise one or more light emitting diodes (LEDs) that are activated red when the measured temperature of the beverage is outside of the temperature range or green when the measured temperature is within the temperature range. As an alternative, as shown, the visual display 36 may comprise an LED display that presents the measured temperature of the beverage 14 in degrees Fahrenheit (or degrees Celsius). The audio indicator 38 may comprise a small speaker or piezoelectric transducer that provides an audio indication of the temperature. For example, if the measured temperature is outside of the temperature range, then the speaker may beep.

The one-way pressure valve 42 selectively permits fluid communication between the interior of the drinking cup 12 and the exterior environment. In instances where the beverage 14 inside the drinking cup 12 is extremely hot, the beverage 14 may emit steam which causes a pressure buildup within the drinking cup 12. The one-way pressure valve 42 opens in response to a buildup of pressure within the drinking cup 12 and alleviates the pressure buildup.

Figure 3:
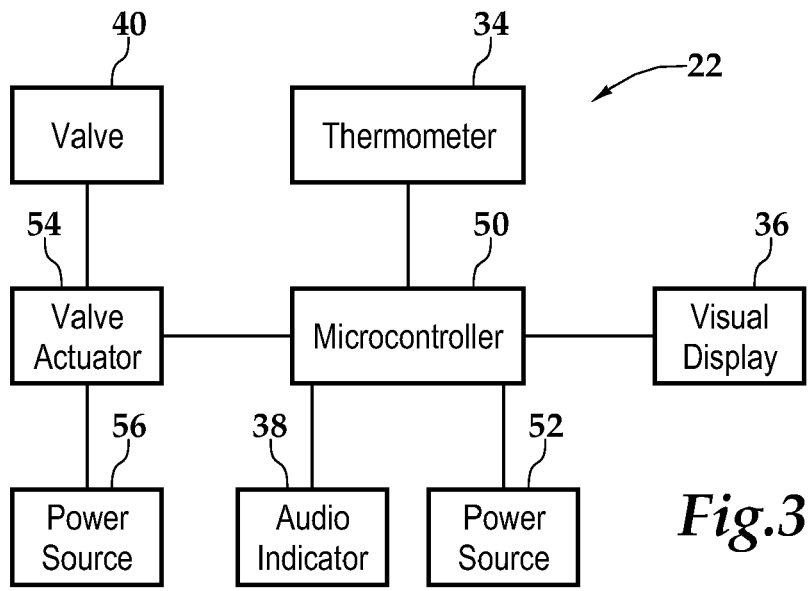
FIG. 3 is a functional block diagram of one embodiment of microcomponents utilized within the safety lid.

FIG. 3 depicts one embodiment of the microcomponents 22 utilized within the safety lid 10. The microcomponents 22 include the aforementioned microcontroller 50, thermometer 34, visual display 36, audio indicator 38, and valve 40 as well as a power source 52 (for the microcontroller 50), a valve actuator 54, and a power source 56 (for the valve actuator 54). The thermometer 34, visual display 36, power source 52, audio indicator 38, and valve actuator 54 are each respectively coupled to the microcontroller 50. The valve 40 and power source 56 are each respectively coupled to the valve actuator 54. Each of the power sources 52, 56 may comprise a battery or, in certain implementations, the power sources 52, 56 may be combined.

In operation, the thermometer 34 measures temperature and drives a temperature signal to the microcontroller 50. The microcontroller 50 evaluates the temperature signal and appropriately controls the visual display 36, audio indicator 38, and valve actuator 54, which opens and closes the fluid passageway 20, with the use of control signals.

As previously discussed, the microcontroller 50 evaluates the temperature signal against at least one temperature threshold. For example, the microcontroller 50 may compare the temperature of the liquid ($T_{Liquid}$) to the temperature threshold ($T_{Threshold}$) and drive an open signal or a close signal to the valve actuator 54 based upon the following relationships:

$$\text{if } T_{Liquid} > T_{Threshold}; \text{ send open signal} \quad (1)$$

$$\text{if } T_{Liquid} <= T_{Threshold}; \text{ send close signal} \quad (2)$$

Alternatively, the temperature threshold may be two temperature thresholds, for example, that define a temperature range. For example, the temperature threshold may include both a low temperature threshold ($T_{Low}$) and a high temperature threshold ($T_{High}$) that are used by the microcontroller 50 in evaluating the following two relationships:

$$\text{if } T_{Liquid} > T_{Low} \text{ and } T_{Liquid} < T_{High}; \text{ send open signal} \quad (3)$$

$$\text{if } T_{Liquid} <= T_{low} \text{ or } T_{Liquid} => T_{High}; \text{ send close signal} \quad (4)$$

It should be appreciated that other types of thresholds are within the teachings of the present invention. For example, a threshold may be a value that must be reached as opposed to exceeded as represented in the following set of equations:

$$\text{if } T_{Liquid} => T_{Low} \text{ and } T_{Liquid} <= T_{High}; \text{ send open signal} \quad (5)$$

$$\text{if } T_{Liquid} < T_{low} \text{ or } T_{Liquid} > T_{High}; \text{ send close signal} \quad (6)$$

The relationships may be programmed as an OEM offering and/or reprogrammed in the field using contact or non-contact approaches. Based upon the evaluation of the relationships, the microcontroller 50 maintains the open or closed state of the fluid passageway 20 or, if the measured temperature has crossed a threshold, the microcontroller 50 changes the state of the fluid passageway 20 from open to closed or closed to open. Further, as previously discussed, the microcontroller 50 provides a visual indication 24 of the temperature as well as an audio indication of the temperature 26 using the visual display 36 and audio indicator 38, respectively.

Figure 4:
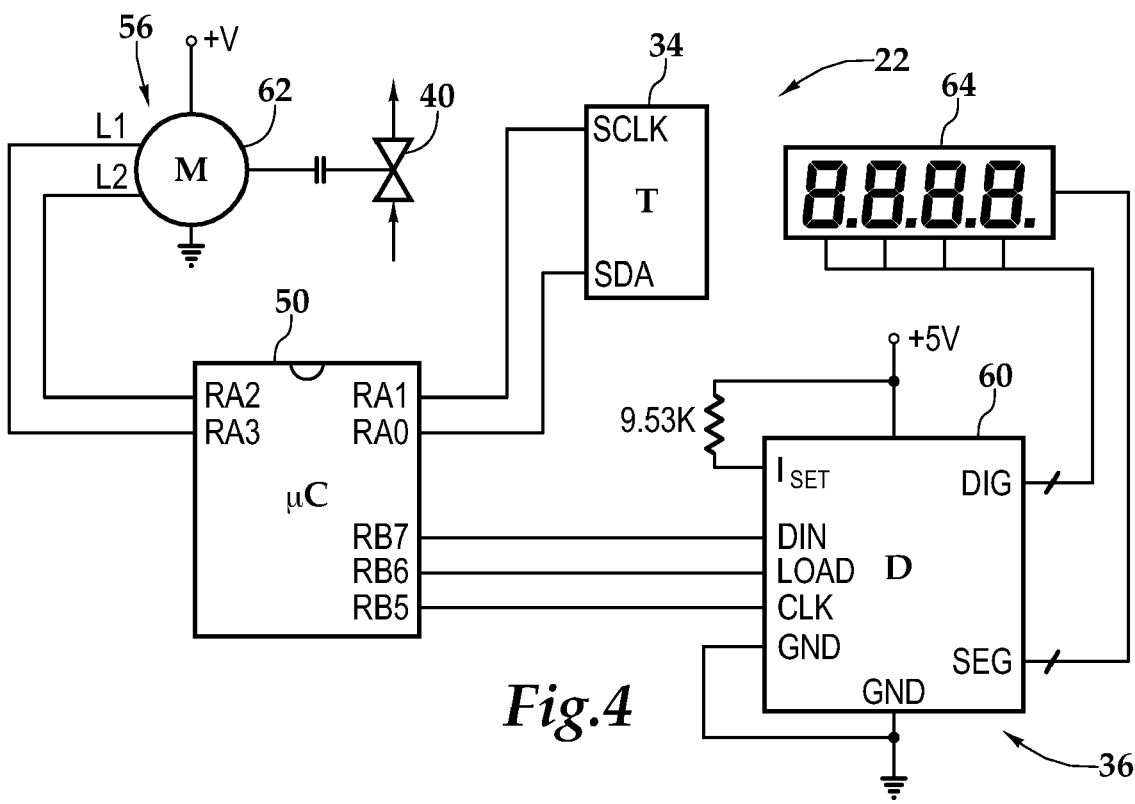
FIG. 4 is a schematic diagram of another embodiment of microcomponents utilized within the safety lid.

FIG. 4 depicts another, more detailed, embodiment of microcomponents 22 utilized within the safety lid 10. It should be appreciated that in this particular embodiment, the audio indicator 38 is not depicted and moreover, it is within the teachings of the present invention to exclude any one or more of the visual display 36, audio indicator 38, valve actuator 54, and valve 40, for example. The thermometer 34 includes a serial clock input (SCLK) pin and a bidirectional serial data (SDA) pin to provide for the exchange of data with the microcontroller 50. With respect to internal processing, the thermometer 34 comprises a serially accessible, digital temperature thermometer sensor particularly suited for low cost and small form-factor applications. Temperature data is converted from the onboard thermal sensing element and made available as a multi-bit digital word to the microcontroller 50 via a multi-wire serial port, i.e, the bidirectional serial data (SDA) pin. Suitable thermometers 34 include the TC74 tiny serial digital thermal sensor from Microchip Technology Inc. (Chandler, Ariz.).

The thermometer 34 is connected to the microcontroller 50 which includes seven bidirectional input/output ports (RA0, RA1; RA2, RA3; RB5, RB6, RB7) which connect to the thermometer 34, an LED display driver 60 that forms a portion of the visual display 36, and a motor 62 that forms a portion of the valve actuator 56, respectively. The microcontroller 50 receives the digital temperature signal from the thermometer 34 and, as previously discussed, compares the information to at least one temperature threshold stored in the memory of the microcontroller 50. In one implementation, the microcontroller 50 utilizes low power, high speed CMOS EPROM/ROM technology to control the operation of the motor 62 and LED display drive 36 based upon the input provided by the thermometer 34 and stored operating parameters, i.e., temperature thresholds.

Based upon the evaluation, the microcontroller 50 drives output signals (RA2, RA3) to the motor 62 and output signals (RB5, RB6, RB7) to the LED display driver 60. In the embodiment presented, the microcontroller 50 is a flash device that may be reprogrammed in the field. This self-programming capability enables remote upgrades to the flash program memory through a variety of medium including radio frequency (RF) and infrared date association (IRDA). For example, using the self-programming capability of the microcontroller 50, the temperature thresholds may be reset, updated, or otherwise changed. Suitable microcontrollers include the PIC16C/PIC16CR series of EPROM-ROM-based 8-bit CMOS microcontrollers from Microchip Technology Inc. (Chandler, Ariz.).

The visual display 36 is depicted as an application circuit comprising an LED array 62 accompanied by the LED display driver 60. As illustrated, the LED display driver 60 includes a power supply input (V+) pin, a digit driver (DIG) pin, a segment driver (SEG) pin, two ground (GND) pins, a serial clock input (CLK) pin, a data input (LOAD) pin, a serial-data input (DIN) pin, and a peak current ($I_{SET}$) pin.

The LED display driver 60 is a multi-wire serial interface that connects to the microcontroller 50 and interfaces the microcontroller 50 with the LED array 64. In particular, the LED display driver 60 converts digital signals from the microcontroller 50 to output signals which allow the display from 1 to 8 digits at the LED array 64. A BCD code-B decoder, multiplex scan circuitry, segment and digit drivers, and an 8×8 static RAM that stores each digit are included in the on-chip circuitry of the LED display driver 60. Suitable application circuit packages include the MAX7219/MAX7221 series of serial input/output common-cathode display drivers from Maxim Integrated Products (Sunnyvale, Calif.).

The LED array 64 comprises a lighting component including segment and digit driver inputs that enable the customizable LED array 64 to illuminate a four digit numeric display that includes a right hand decimal point. Such LED arrays 64 are available in a selection of colors and display sizes. Suitable LED arrays include the LCQ-3632 series of lighting components from LC LED Corporation (www.lc-led.com).

In one implementation, the motor 62 comprises a DC gearmotor having an in-line gear train that is compact but yet provides sufficient torque. Two lead wires (L1, L2) connect the microcontroller 50 to the motor 62. The motor 62 controls the valve 40 which selectively permits and restricts fluid flow through the safety lid 10. In another embodiment, the motor may comprise a servomotor or approximately 1.2 inch (3 cm) DC gearmotor that creates linear motion to open and close with linear motion as opposed to rotation.

Figure 5A:
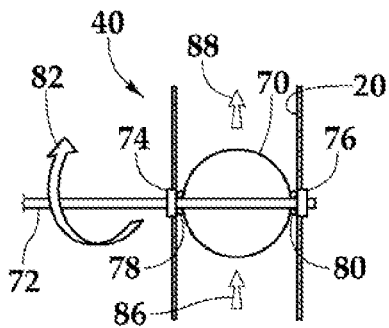
FIG. 5A is a cross-sectional side view of one embodiment of a valve positioned in the fluid passageway of the safety lid in an open configuration.
Figure 5B:
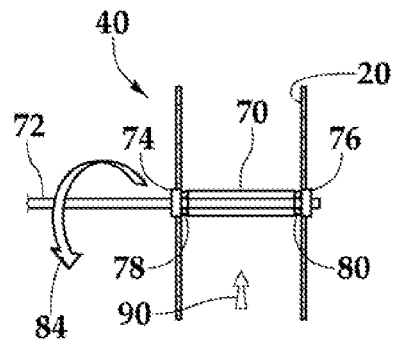
FIG. 5B is a cross-sectional side view of the valve of FIG. 5A in an closed configuration.

FIGS. 5A and 5B depict one embodiment of the valve 40 positioned in the fluid passageway 20 of the safety lid. The valve 40, which is depicted as a butterfly valve, includes a butterfly disk 70 that is mounted to an arm 72 which traverses the fluid passageway 40 and is journalled for rotation to a side wall, which forms a portion of the body 18, of the fluid passageway 20 with sleeve brackets 74, 76. Although not depicted in FIGS. 5A and 5B, the arm 72 is coupled for rotation to the motor 62. Seals 78, 80 are positioned at the side wall of the fluid passageway 20 proximate to each of the sleeve brackets 74, 76 to maintain a seal and prevent leakage. The seals may be under positive pressure when in the closed position, thereby providing a positive seal around the periphery of the butterfly disk.

The butterfly valve 40 is quick acting and provides positive shut-off. Each quarter of a turn by the arm 72 rotates the butterfly disk 70 by 90°. More specifically, in operation, the motor 62 rotates the arm 72 a quarter of a turn, as depicted by arrow 82, to close the fluid passageway 20. Similarly, the arm 72 advances a quarter of a turn, as depicted by arrow 84, to open the fluid passageway 20. It should be appreciated that although a butterfly valve is depicted, other types of valves and sealing mechanisms may be utilized in accordance with the teachings presented herein.

As depicted in FIG. 5A, the motor 62, under the command of the microcontroller 50, has actuated the butterfly disk 70 to the open position as the following relationship is satisfied:

$$T_{Liquid} > T_{Low} \text{ and } T_{Liquid} < T_{High} \qquad (7)$$

In the open position, fluid flows freely through the fluid passageway 20 as indicated by arrows 86, 88.

As the beverage cools, the following relationship is satisfied and the microcontroller 50 signals the motor 62 to actuate the butterfly disk 70 to the closed position:

$$T_{Liquid} <= T_{low} \text{ or } T_{Liquid} => T_{High} \qquad (8)$$

In the closed position, fluid is blocked as indicated by arrow 90.

Figure 6:
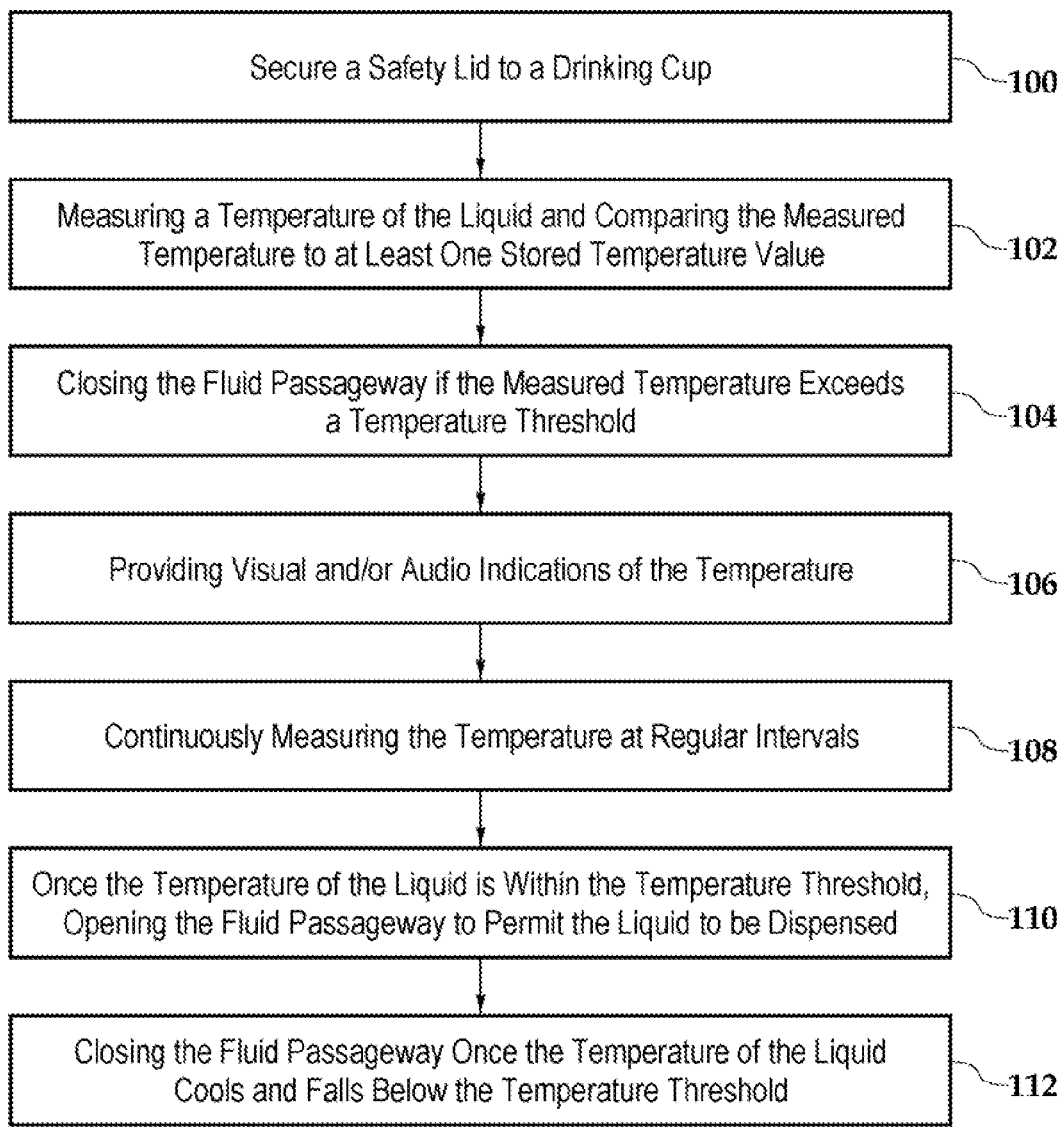
FIG. 6 is a flow chart depicting one embodiment of a method that utilizes one embodiment of the safety lid to monitor temperature in a drinking cup.

FIG. 6 depicts one embodiment of a method that utilizes one embodiment of the safety lid to monitor temperature in a drinking cup. At block 100, a safety lid is secured to a drinking cup having a liquid therein. The safety lid includes a fluid passageway therethrough that permits the liquid to be sipped. At block 102, a thermometer measures a temperature of the liquid and a microcontroller compares the measured temperature to at least one stored temperature value. At block 104, the fluid passageway is closed if the measured temperature exceeds a temperature threshold. For purposes of explanation, the measured temperature exceeds the temperature threshold and the fluid passageway is closed. At block 106, a visual indication of the temperature is provided on a visual display embedded within the safety lid. Additionally, an audio indication alerting an individual that the temperature exceeds a temperature threshold may be provided at this step.

At block 108, the safety lid continues to measure the temperature at regular intervals and display the temperature and provide the audio indications. At block 110, once the temperature of the liquid is within the temperature threshold, then the fluid passageway is opened to permit the liquid to be sipped or poured. At this step, a visual indication of the temperature continues to be provided. In one implementation, the audio indication that the measured temperature is outside of the temperature threshold is discontinued, however. At block 112, the temperature of the liquid continues to cool and falls below the temperature threshold. The fluid passageway is closed, a visual indication of the temperature is provided, and the audio indication recommences.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method for monitoring temperature, the method comprising:

securing a safety lid to a drinking cup having a liquid therein, the safety lid having a fluid passageway therethrough that permits the liquid to be sipped;

measuring a temperature of the liquid with a thermometer embedded in the safety lid;

comparing the measured temperature to at least one stored temperature value;

responsive to comparing the measured temperature to at least one stored temperature value, closing the fluid passageway if the measured temperature exceeds a temperature threshold; and providing a visual indication of the temperature on a visual display embedded within the safety lid.

2. The method as recited in claim 1, further comprising opening the fluid passageway if the measured temperature is within the temperature threshold.

3. The method as recited in claim 1, further comprising providing an audio alert if the measured temperature exceeds the temperature threshold.

4. A system for monitoring a temperature of a liquid, the system comprising:

a safety lid secured to a drinking cup having the liquid therein, the safety lid having a fluid passageway therethrough that permits the liquid to be sipped;

means for measuring the temperature of the liquid with a thermometer embedded in the safety lid;

means for comparing the measured temperature to at least one stored temperature value;

means for closing the fluid passageway if the measured temperature exceeds a temperature threshold following the temperature comparison; and means for providing a visual indication of the temperature on the safety lid.

5. The system as recited in claim 4, further comprising means for opening the fluid passageway if the measured temperature is within the temperature threshold.

6. The system as recited in claim 4, further comprising means for providing an audio alert if the measured temperature exceeds the temperature threshold.

7. A safety lid for use in combination with a drinking cup, the safety lid comprising:

a body of integrally molded construction that is shaped to fit a lip of the drinking cup;

a fluid passageway traversing the body, the fluid passageway permitting a liquid in the drinking cup to be sipped therethrough;

a valve positioned in the fluid passageway;

a thermometer embedded in the body, the thermometer for measuring the temperature of the liquid and driving a temperature signal;

a microcontroller embedded in the body, the microcontroller responsive to the temperature signal, for evaluating the temperature signal and driving first and second control signals;

a visual display embedded in the body, the visual display responsive to the first control signal, for displaying the temperature; and a valve actuator, responsive to the second control signal, for actuating the valve if the measured temperature exceeds a temperature threshold.

* * * * *